Dec. 24, 1968   R. W. HATCH, JR., ET AL   3,417,773
PNEUMATIC REPEATER

Filed Feb. 13, 1967   3 Sheets-Sheet 1

INVENTORS
RICHARD W. HATCH JR.
LAWRENCE W. MURPHY
BY David E. Hoppe
ATTORNEY

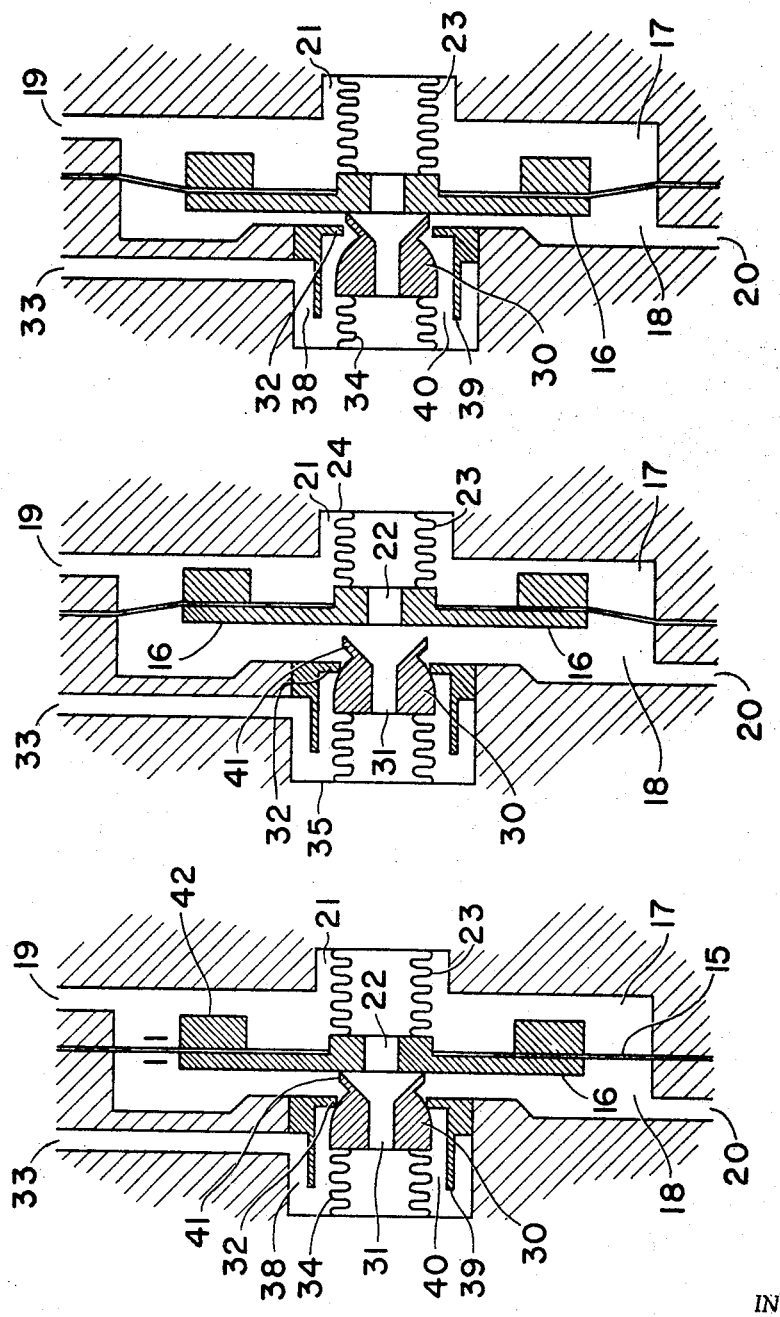

Dec. 24, 1968  R. W. HATCH, JR., ET AL  3,417,773
PNEUMATIC REPEATER
Filed Feb. 13, 1967  3 Sheets-Sheet 3

INVENTORS
RICHARD W. HATCH JR.
LAWRENCE W. MURPHY
BY David E. Hoppe
ATTORNEY

United States Patent Office 3,417,773
Patented Dec. 24, 1968

3,417,773
PNEUMATIC REPEATER
Richard W. Hatch, Jr., Norwell, and Lawrence W. Murphy, North Attleboro, Mass., assignors to The Foxboro Company, Foxboro, Mass., a corporation of Massachusetts
Filed Feb. 13, 1967, Ser. No. 615,546
14 Claims. (Cl. 137—85)

ABSTRACT OF THE DISCLOSURE

A diaphragm separates a recess within a housing into a signal pressure chamber and a repeating pressure chamber; for the condition of signal pressure lower than repeating pressure, the diaphragm is moved away from an exhaust valve permitting pressure in the repeating chamber to vent to atmosphere; for the condition of signal pressure higher than repeating pressure the diaphragm forces the exhaust valve to move which in turn unseats a supply valve permitting the supply pressure to enter the repeating pressure chamber; thus the repeating chamber pressure follows the pressure of the signal chamber.

---

Figure 1:
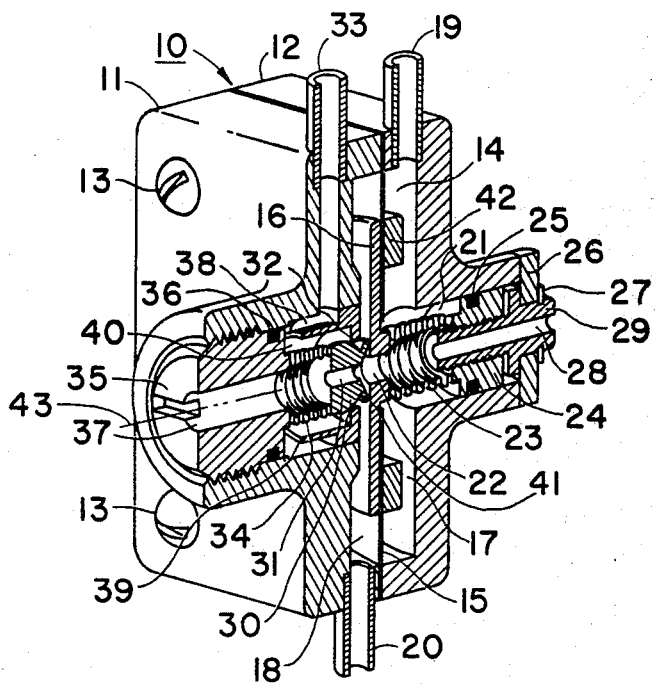
Figure 5:
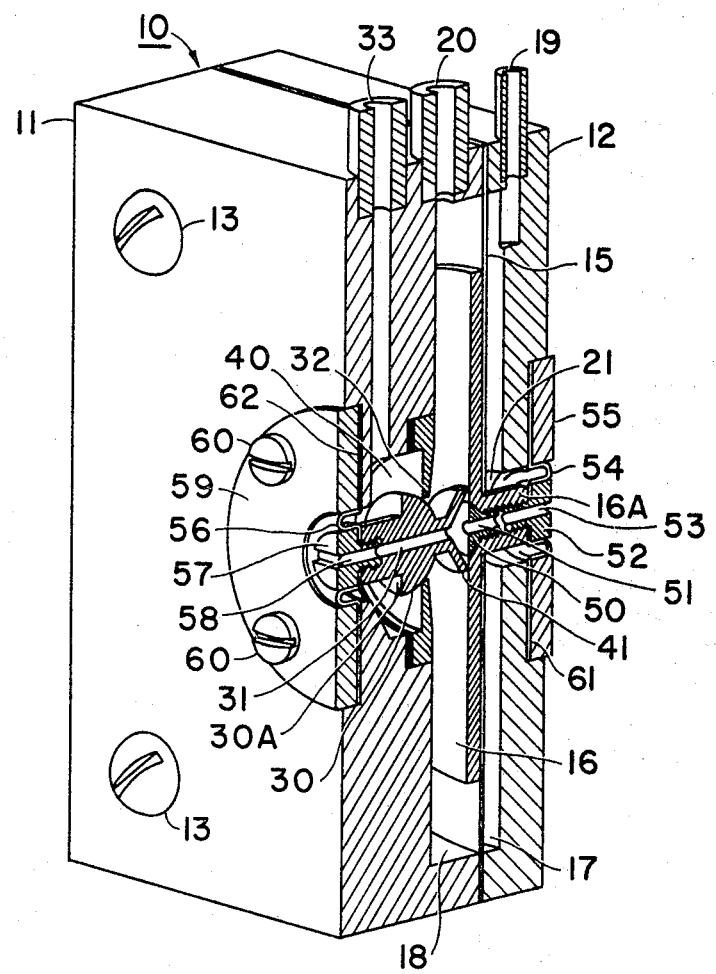

Pneumatic repeaters are employed in industrial control systems to translate a signal pressure having relatively limited loading capabilities into a related output pressure capable of supplying a load, typically a pneumatically-operated valve actuating mechanism requiring 1–5 cubic feet per minute. Typically, a 1–1 input-output pressure ratio is provided, although certain applications may employ other ratios such as may be suitable for the conversion of signals produced by one standard signal range into an output adapted for another standard signal range.

Commercially available pneumatic repeaters have appreciable amounts of droop or deviation in the output pressure from the pressure of the input signal as a function of increasing output load. Typically, valve actuators drawing in excess of 3–5 cubic feet per minute produce large deviations in the output pressure of the repeater from the pressure supplied by the input signal. Also, more frequently encountered smaller loads normally occurring during valve actuation produce output deviations of 0.1–0.5 p.s.i. and even higher deviations.

Commercially available pneumatic repeaters are often sensitive to variations in supply pressure, so any such variations result in an appreciable deviation of the output signal pressure from that of the input signal.

It is highly desirable for pneumatic repeaters to be fairly linear in the region of operation in which signal pressure goes above or below the output pressure. It is very common to find a marked non-linearity or dead-banding in commercially available devices in this cross-over region.

In order to meet these and other problems the present invention provides a single flexibly-mounted diaphragm suspended within a housing recess so as to divide it into an input signal pressure chamber and an output signal pressure chamber. The input signal pressure side of the diaphragm is enclosed so that the signal pressure cannot escape therefrom. The output signal pressure chamber may be vented to atmosphere through an exhaust valve unseated from the diaphragm face by movement of the diaphragm in the direction of the input signal pressure chamber in response to a lower input signal pressure; advancing of the diaphragm towards the output signal pressure chamber in response to a higher input signal pressure forces a repositioning of the exhaust valve seated against the diaphagm face which is turn unseats a valve member from a supply seat allowing the supply pressure to enter into the output signal pressure chamber. Statically, both the exhaust valve seat and the supply valve seat are closed so that the output signal pressure chamber is effectively isolated except for the output pressure line. Provision is made for static balancing of the diaphragm and valve components for improved dynamic operation.

Such a configuration provides an improved pneumatic repeater having a minimum number of moving parts and having good characteristics of droop, immunity from supply pressure variations, and improved linearity, especially in the cross-over region calling for a reversal of output signal pressure flow.

These and other advantages of the invention will be in part apparent from the specification below and in part from the claims taken in conjunction with the drawings in which;

FIGURE I is a half-sectioned three dimensional view of an embodiment of the invention;

FIGURE II is a schematic cross-sectional view of the diaphragm and valving arrangement for the static operating condition;

FIGURE III is a cross-sectional schematic view of the diaphragm and valving arrangement for the condition of a relatively low input signal pressure;

FIGURE IV is a schematic cross-sectional view of the diaphragm and valving arrangement for the condition of a relatively high input signal pressure;

FIGURE V is a half-sectioned three dimensional view of a second embodiment of the invention.

Referring to FIGURE I, pneumatic repeater 10 has a housing formed by housing members 11 and 12, which are bolted together by bolts 13 to form an enclosed recess 14 therebetween. Flexible diaphragm 15 separates housing members 11 and 12, extending between the mating surfaces of housing members 11 and 12, providing a pressure tight fitting therebetween, and further extending in the mating plane through recess 14. Diaphragm 15 thereby separates recess 14 into an input signal pressure chamber 17 and an output signal pressure chamber 18.

Illustratively, an input signal of 3–15 p.s.i. is supplied through inlet 19 opening through housing member 12 into input signal pressure chamber 17. The pneumatic repeater output is taken from output pressure chamber 18 through outlet 20 which opens through housing member 11.

Flexible diaphragm 15 provides a movable support for diaphragm fitting 16 and clamp 42, affixed to opposing sides of diaphragm 15, diaphragm fitting 16 being affixed to diaphragm 15 on the output signal pressure chamber 18 side thereof. Diaphragm fitting 16 has a circular shape and is positioned normal to and centered on center line 43 extending through pneumatic repeater 10. Diaphragm fitting 16 is preferably of a rigid material such as may be filled with Teflon so that its unattached surface is relatively smooth and slippery. Diaphragm fitting 16 has an aperture 22 through the center thereof. Clamp ring 42 is affixed to the opposite side of diaphragm 15, thereby stabilizing that portion of diaphragm 15 co-extensive with the attached surface of diaphragm fitting 16. In this manner, rigid diaphragm fitting 16 is effectively suspended about its periphery by the movable portion of diaphragm 15.

A central portion of diaphragm 15 concentric about center line 43 is cut away permitting a central part of diaphragm fitting 16 to extend therethrough into the input pressure chamber 17 side of diaphragm 15. This extension of diaphragm fitting 16 is cylindrical in shape and concentric with center line 43. One end of bellows 23 is sealably fixed to the periphery of this extension of diaphragm fitting 16 thereby being oriented about center line 43 in input pressure chamber 17. The other end of bellows 23 extends within a suitably configured concavity 21 of input chamber 17 which concavity 21 is concentric with center line 43. The extended end of bellows 23 is sealably attached to bellows retainer 24 which closes off the end of concavity 21 of chamber 17. A pressure type relationship between retainer 24 and chamber 17 is obtained by means of O-ring 25 inserted therebetween. Insert 29 is threaded through the center of bellows retainer 24 and is held in place on one end thereof by washer member 26 and C-ring 27 on the exterior of housing member 12, so that insert 29 is free to rotate about center line 43. Since insert 29 is threaded into the center of 24 relative movement of retainer 24 along center line 43 may be effected by rotation of insert 29. This movement adjusts the fixed end and thus the loading of bellows 23. Venting aperture 28 extends through insert 29, thereby venting the interior region of bellows 23 to atmosphere.

Movable valve spool 30 which may be more clearly seen in relationship to its co-acting components in FIGURES II, III, and IV, has a shape uniform about a center axis thereof, and has a relatively narrow center portion intermediate its ends which are normal to center line 43. Valve spool 30 has an aperture 31 therethrough along center line 43, and has at the end facing the center of diaphragm fitting 16 a circular exhaust control 41 which is adapted to seat against the corresponding part of diaphragm fitting 16, thereby covering aperture 22 through the center of diaphragm fitting 16. Valve spool 30 has a configuration adapted to allow a portion of its body rest on supply valve seat 32. Supply valve seat 32 is concentric about center line 43 and forms an orifice between output signal pressure chamber 18 and an area 40 to which the supply pressure is provided. Valve spool 30 has sealably fixed to its end opposite exhaust control 41 a bellows 34 which thereby extends into area 40 along center line 43. The far end of bellows 34 is fixed to threaded plug insert 35 which is sealably mounted to housing member 11 by means of O-ring 36. Venting passage 37 extends through plug insert 35 permitting the interior area of bellows 34 to be vented to atmosphere.

Atmospheric venting is continuous along the center line 43 of pneumatic repeater 10, from aperture 37 to aperture 28. Starting from the exterior of plug insert 35, the venting extends through venting passage 37, the interior of bellows 34, the venting passage 31 through valve spool 30, center aperture 22 through diaphragm member 16, the interior of bellows 23, to venting passage 28 extending through insert 29 to the opposite exterior thereof. It is to be noted that pneumatic repeater 10 may operate with a single direction of venting from exhaust control 41, either solely out aperture 37, or aperture 28. Double venting provides for increased reverse flow and thus faster operation.

The supply pressure is furnished through supply inlet 33 opening through the body of housing member 11 into a supply area 38 concentric about bellows 34. Area 38 is separated from area 40 by baffle 39 which diverts the flow of the supply pressure in its passage to supply valve 30 and seat 32.

Reference is made to FIGURE II for purposes of explaining the operation of pneumatic repeater 10 in the static condition of operation. The end of valve spool 30 abutting diaphragm fitting 16 has a conical recessed configuration forming a relatively sharp edged end portion 41 for contacting the smooth slippery surface of diaphragm fitting 16 thereby forming the exaust valve combination 30–16.

The supply valve is formed by the combination of the relatively sharp edge of valve seat 32 contacting a concentric portion on the body of valve spool 30. In the static condition of operation output pressure chamber 18 is prevented from venting to atmosphere through the exhaust valve control 41 portion of spool 30. Similarly, output pressure chamber 18 is isolated from the supply pressure area 40 by the seating of valve spool 30 against valve seat 32 in the static condition. Thus, under the static condition of operation, output signal pressure chamber 18 has no effective opening therefrom either to atmosphere or to the supply pressure.

Referring to FIGURE III, for the condition of decreased input signal pressure supplied to inlet 19 and thus to input signal pressure chamber 17, as compared with the existing pressure in output signal pressure chamber 18, the greater output pressure in chamber 18 forces diaphragm fitting 16 away from its abutting relationship with exhaust control portion 41 of valve spool 30. The opening created thereby between portion 41 and the face of diaphragm fitting 16 permits the excess pressure in chambers 18 to vent through apertures 22 and 31 and thence to atmosphere. The excess pressure includes any pressure supplied by outlet 20 to a pneumatically-actuated mechanism, so that the output system pressure may be relieved by reverse flow exiting through exhaust valve 30–16 to atmosphere. The size of the venting passages to atmosphere determines the rapidity an external device may be relieved to repostion in accordance with a lowered pressure signal. When the excess pressure is relieved, the pressure between chamber 18 and chamber 17 is equalized and diaphragm fitting 16 tends to return to its former position in abutting contact with valve member 30, thereby sealing off output pressure chamber 18 from atmosphere and restoring penumatic repeater 10 to a static condition of operation.

Referring to FIGURE IV, the condition of an increased input signal pressure supplied through inlet 19 is shown, wherein the greater pressure in input signal pressure chamber 17 advances diaphragm fitting 16 into output signal pressure chamber 18. This advancement forces the abutting valve spool 30 against the loading provided by bellows 34 and away from the spool 30 rest position on valve seat 32, thereby permitting supply pressure from inlet 33 to pass through area 38, around baffle 39, through area 40 and through the opening between valve seat 32 and valve spool 30 into chamber 18. When the increasing pressure in output signal pressure chamber 18 sufficiently balances the pressure in chamber 17, diaphragm fitting 16 is restored to its static position which allows the body of valve spool 30 to reseat on valve seat 32 and thereby restore the static condition of operation.

In the above manner, the pressure in output signal pressure chamber 18 is maintained at the same pressure appearing in input signal pressure chamber 17, notwithstanding loading of outlet 20 from chamber 18 by an external air-operated device.

The relative sizes of supply seat 32, the exhaust seat control 41, and both bellows 23 and 34 is of significance in the operation of the pneumatic repeater. It is desirable to provide a balance of static pressures associated with pneumatic repeater 10 so that performance is optimized. Relative sizing is provided so that valve spool 30 is statically balanced, or preferably has a slight bias to set spool 30 on supply seat 32. By providing for the effective diameter of bellows 34 to be somewhat smaller than the diameter of supply seat 32, valve spool 30 is biased by the supply pressure to rest against seat 32. In addition, a slight preloading spring bias may be provided by suitable positioning of bellows support 35, illustratively to obtain approximately one pound of spring bias. Equalizing of the relative diameters of bellows 34 and supply seat 32 provides a static equilibrium for valve spool 30 inasmuch as the supply pressure in area 40 surrounding bellows 34 acts in a direction to force spool 30 against seat 32, this force increasing with decreasing diameter of bellows 34. That is, a smaller bellows 34 reduces the relief of spool 30 provided by the atmospheric pressure in the interior of bellows 34. The supply pressure in area 40 surrounding the portion of valve spool 30 between bellows 34 and valve seat 32 relieves the loading of valve spool 30 against supply seat 32 to the extent that the diameter of seat 32 is reduced.

It is also desirable to make the diameter of exhaust seat control 41 about equal to the diameter of supply seat 32 to balance the atmospheric pressure active from both directions along center line 43 upon spool 30. If the diameter of exhaust seat 41 were relatively small as compared to the diameter of supply seat 32, and the effective diameter of bellows 34 the effect of the output pressure in chamber 18 upon spool 30 would be increased, and a tendency increasing with output pressure would exist to force spool 30 away from seat 32 thereby causing undesired leakage or oscillation.

The effective diameter compensator bellows 23 should be approximately equal to the diameter of exhaust seat 41 to equalize the overall static pressure as related to both sides of diaphragm fitting 16. That is, exhaust seat 41 subtends an area on the face of diaphragm fitting 16 which is thereby exposed to atmosphere and the output signal pressure on diaphragm 16 thus correspondingly is reduced. To provide proper static equilibrium compensator bellows 23 subtends an approximately equal area on the opposite side of diaphragm fitting 16, thereby also exposing that area to atmosphere and thus tending to equalize the pressure on both faces of diaphragm fitting 16. So too, the diameter of compensator bellows 23 should be equal to the diameter of bellows 34 so that the unseating of valve spool 30 from seat 32 does not introduce a new imbalance of forces upon diaphragm fitting 16 other than the input-output pressure differential. When the proper relationships are observed as between the diameters or effetcive areas of both bellows, and the diameters of the supply and exhaust seats, static equilibrium is obtained which augments or facilitates the proper operation of the pneumatic repeater under dynamic operating conditions. The preloading of valve member 30 assures the return of valve member 30 against supply seat 32 after the provision of the requisite flow of supply required to rebalance the pneumatic repeater.

Referring to FIGURE V, another embodiment of the invention is illustrated in the form of a three dimensional half-sectioned view. Reference numerals designating components in FIGURE V having close resemblance to components of the embodiment of FIGURE I, are the same as the numerals of FIGURE I.

Housing members 11 and 12 are clamped together with diaphragm 15 inserted therebetween, thereby forming input pressure chamber 17 and output pressure chamber 18. The input pressure signal is supplied to inlet 19, and outlet 20 furnishes output flow from output pressure chamber 18 to a load device, such as a conventional pneumatic valve actuator. Circular diaphragm fitting 16 is affixed to the output pressure chamber 18 side of diaphragm 15 by suitable means, illustratively adhesive means. Diaphragm fitting 16 has an extended central section 16A normal to the plane of diaphragm 15 protruding through a cut-out in the center of diaphragm 15 into input pressure chamber 17 and terminating in cylindrical recess 21 of input pressure chamber 17. Fitting 16 including central extension 16A thereof is centrally recessed and threaded through the center thereof and by this provision fitting 16 is adapted to receive threaded insert 50 from the output pressure chamber 18 side thereof and is adapted to receive threaded screw 52 from the other side of fitting 16. Aperture 51 extends through insert 50 and aperture 53 extends through screw 52, thus defining a vent passage through the center of fitting 16 running from output pressure chamber 18 to atmosphere.

Screw 52 is adapted to sealably mount flexible member 61 to the termination of extension 16A, screw 52 being inserted through the center of flexible member 61 and tightened until the head of screw 52 compresses a central portion of flexible member 61 between it and the end of diaphragm fitting extension 16A; the head of screw 52 is extended to housing member 12 and thus at atmospheric pressure. Member 61 is a circular flexible sheet formed of a resilient material such as rubber, and having a concentric half-circle convolution 54 formed therein positioned between diaphragm fitting extension 16A and the periphery of recess 21. The outer edge of resilient member 61 is clamped in place by clamp fitting 55. With this arrangement half-circle convolution 54 in member 61 is disposed concentrically with the end of extension 16A thereby forming the termination of recess 21. The half-circle convolution 54 is a lip seal with the open end thereof facing input pressure chamber 17; convolution 54 permits diaphragm fitting 16 to move in the direction normal to its plane by flexing of the inner convolution lip relative to the outer lip.

Flexible member 61 performs a function analogous to that of bellows 23 in FIGURE I; an effective area of the center of diaphragm fitting 16 on the extension 16A side is exposed to atmosphere according to the mean diameter of the half-circle convolution 54 of resilient member 61. That is, a central portion of diaphragm fitting 16 is effectively isolated from the effects of the pressure of input pressure chamber 17 by provision at flexible member 61.

On the output pressure chamber 18 side of diaphragm 15 spool 30 has an exhaust valve control 41 adapted to seat against the face of diaphragm fitting 16, and has a portion of its body adapted to fit against supply seat 32, the operation is similar to that of spool 30 of FIGURE I. Spool 30 has an extension 30A on its end opposite exhaust valve control 41, to which flexible member 62 is sealably clamped by means of the head of threaded screw 57. Flexible member 62 has a concentric convolution 56 positioned between the periphery of extension 30A of spool 30 and a peripheral portion of housing 11, thereby sealably disposing spool 30 centrally in supply chamber 40. Flexible member 62, by means of convolution 56, permits spool 30 to move along the direction of its aperture 31 therethrough, which is normal to the plane of diaphragm 15. Threaded screw 57 has an aperture 58 therethrough continuing the passage of aperture 31 and providing exhaust venting means to atmosphere from output pressure chamber 18. Plate 59 clamps the periphery of flexible member 62 to housing member 11, plate 59 being fixed by means of screws 60. Member 62 performs the function analogous to bellows 34 in FIGURE I, effectively exposing to atmosphere the end area of spool 30, thereby preventing the supply pressure effect thereon. The area of spool 30 thereby isolated from the supply pressure is determined by the mean diameter of convolution 56 of member 62.

With the substitution of flexible members 61 and 62 for the bellows 23 and 34 shown in FIGURE I, the pneumatic repeater 10 of FIGURE V functions in a manner described above in connection with the description of the embodiment of FIGURE I. Use of resilient members 61 and 62 permits a compact and simple assembly.

The central exhaust venting is disposed through passages 51 and 53 on the input pressure chamber side of diaphragm 15 and through passages 31 and 58 on the output pressure chamber side thereof. It is desirable to have as free an access to atmosphere as may be possible so that rapid reverse flow discharge of the load device at outlet 33 may be effective thereby. The double venting shown facilitates this reverse flow discharge, and increased diameter of the apertures forming the exhaust vents further facilitates a discharge of output pressure chamber 18 and the air-operated load device at outlet 33.

The embodiment of the invention illustrated in FIGURE I may conveniently be zeroed at a selected input-output pressure by rotating insert 29, thereby moving bellows retainer 24 through cylindrical recess 21 along center line 43, until the spring loading of bellows 23 thus affected causes the output pressure at outlet 20 to equal the input pressure at inlet 19 as closely as may be possible. It is thought a static balance is thereby achieved in which the spring loading of diaphragm fitting 16 against exhaust control 41 is made equal to the effective loading of spool 30 against supply seat 32. Thereby, any change in input signal pressure is allowed to immediately operate the valving combination as necessary for rebalance.

The embodiment of FIGURE V may be similarly zero-adjusted by incorporating therein provision to move the mounting plane of flexible member 61 relative to the plane of diaphragm 15.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A pneumatic repeater for translating a pneumatic signal pressure into an equivalent output pressure having the capability of supplying a load comprising, a housing having a recess therein divided by a movable diaphragm into an input pressure chamber and an output pressure chamber, means for furnishing an input signal pressure to said input pressure chamber, means for furnishing an output signal pressure from said output pressure chamber, a valving combination disposed proximate the side of said diaphragm enclosing said output pressure chamber with said valving combination including means for venting said output pressure chamber to atmosphere in the condition of a pressure in said input pressure chamber being lower than the pressure in said output pressure chamber wherein said diaphragm responding to said condition withdraws away from said valving combination with the opening therebetween communicating said output pressure chamber to said means for venting said output chamber to atmosphere and said valving combination including means for providing access for a supply pressure into said output pressure chamber in the condition of a pressure in said input pressure chamber being higher than the pressure in said output pressure chamber wherein said diaphragm responding thereto advances against said valving combination thereby opening said access.

2. The pneumatic repeater of claim 1 wherein said valving combination includes a movable valve member having a first portion thereof adapted to fit against said output pressure chamber side of said diaphragm and said movable valve member having a second portion adapted to fit against a valve seat separating a source of supply pressure from said output pressure chamber with said valve seat adapted to restrain the movement of said movable valve member from following said diaphragm as it is withdrawn into said input pressure chamber in response to a decrease in input signal pressure therein thereby permitting said diaphragm to withdraw from said first portion of said valve member providing an opening therebetween for venting excess pressure in said output pressure chamber through said means for venting and with said valve member being movable away from said valve seat in response to an advancing of said diaphragm into said output pressure chamber in response to an increase in input signal pressure thereby opening said access between said source of supply pressure and said output pressure chamber.

3. A pneumatic repeater for translating a pneumatic signal pressure into an equivalent output pressure having the capability of supplying a load comprising, a housing having a recess therein, a movable diaphragm dividing said recess into an input pressure chamber and an output pressure chamber, means for furnishing an input signal pressure to said input pressure chamber, means for furnishing an output signal pressure from said output pressure chamber, a venting passage disposed along the center line of said pneumatic repeater normal to the plane of said diaphragm for venting said output pressure chamber to atmosphere, a supply passage for furnishing a supply pressure to said output pressure chamber, a movable valving body disposed proximate the side of said diaphragm enclosing said output pressure chamber with said valving body including an exhaust valve section adapted to seat against a central portion of said diaphragm to thereby control access between said output pressure chamber and said venting passage and with said valving body including a supply valve section adapted to seat against a supply valve seat separating said supply passage from said output pressure chamber to thereby control access between said supply passage and said output pressure chamber, whereby in the condition of a pressure in said input pressure chamber lower than the pressure in said output pressure chamber said diaphragm responding to said condition withdraws from said exhaust valve section of said valving body which body is positionally restrained by the seating of said body on said supply seat thereby opening said output pressure chamber to said venting passage, and in the condition of a pressure in said input pressure chamber higher than the pressure in said output pressure chamber said diaphragm in response thereto advances against said valving body thereby unseating said supply valve section of said body and opening said output pressure chamber to said supply passage.

4. The pneumatic repeater of claim 1 wherein compensation means is provided for equalizing static pressure on both sides of said diaphragm.

5. The pneumatic repeater of claim 3 wherein said central portion of said diaphragm includes a centrally located rigid portion thereof.

6. The pneumatic repeater of claim 3 wherein said central portion of said diaphragm includes a rigid portion thereof adapted from the seat of said exhaust valve section with said seat having a slippery surface.

7. The pneumatic repeater of claim 3 wherein said venting passage runs centrally through said movable valving body.

8. The pneumatic repeater of claim 3 wherein said venting passage runs through the center of said diaphragm, opening therethrough with a diameter sufficiently small to be covered by said exhaust valve section of said valving body thereby permitting closing of said venting passage from said output pressure chamber when said exhaust valve section is seated against said diaphragm.

9. The pneumatic repeater of claim 3 wherein the effective pressure-responsive areas on either side of said diaphragm are balanced in the static condition of operation by providing expansion chamber means exposing to atmosphere equivalent central areas on each side of said diaphragm during such static condition thereby providing a static balance of said pneumatic repeater minimizing dead-banding and cross-over non-linearity.

10. The pneumatic repeater of claim 3 wherein the areas subtended by said supply valve seat and by said exhaust valve section are made approximately the same to provide a static balance therebetween thereby minimizing dead-banding and crossover non-linearity.

11. The pneumatic repeater of claim 3 wherein first and second expansible chamber means are provided for effectively equalizing the pressure-responsive areas on either side of said diaphragm, said first and second expansible chamber means being centrally disposed on either side of said diaphragm, said first expansible chamber means being attached to said movable valve member and said second expansible chamber means being attached to the input pressure chamber side of said diaphragm, with the center portions of said first and second expansible chamber means having approximately the same area and having access to atmosphere.

12. The pneumatic repeater of claim 11 wherein the areas of said supply valve seat and said exhaust valve section are also approximately the same as the effective areas of said expansible chamber means thereby providing a static balance between valve members and diaphragm.

13. The pneumatic repeater of claim 11 wherein the effective area of said first expansible chamber means is the same as the area of said supply seat to thereby minimize supply pressure effect upon dynamic operation.

14. The pneumatic repeater of claim 11 in which the effective area of said first expansible chamber means is slightly smaller than the area subtended by said supply valve seat to thereby preload said supply valve section of said valving body.

References Cited

UNITED STATES PATENTS

| | | | |
|---|---|---|---|
| 1,586,705 | 6/1926 | Roucka | 137—85 XR |
| 1,991,059 | 2/1935 | Norwood | 137—85 |
| 2,431,297 | 11/1947 | Moore | 137—85 |
| 3,194,497 | 7/1965 | Thorburn | 137—85 XR |
| 3,256,740 | 6/1966 | Tate et al. | 137—85 |
| 3,375,843 | 4/1968 | Buratti | 137—85 |

JOHN PETRAKES, *Primary Examiner.*